Patented Apr. 22, 1941

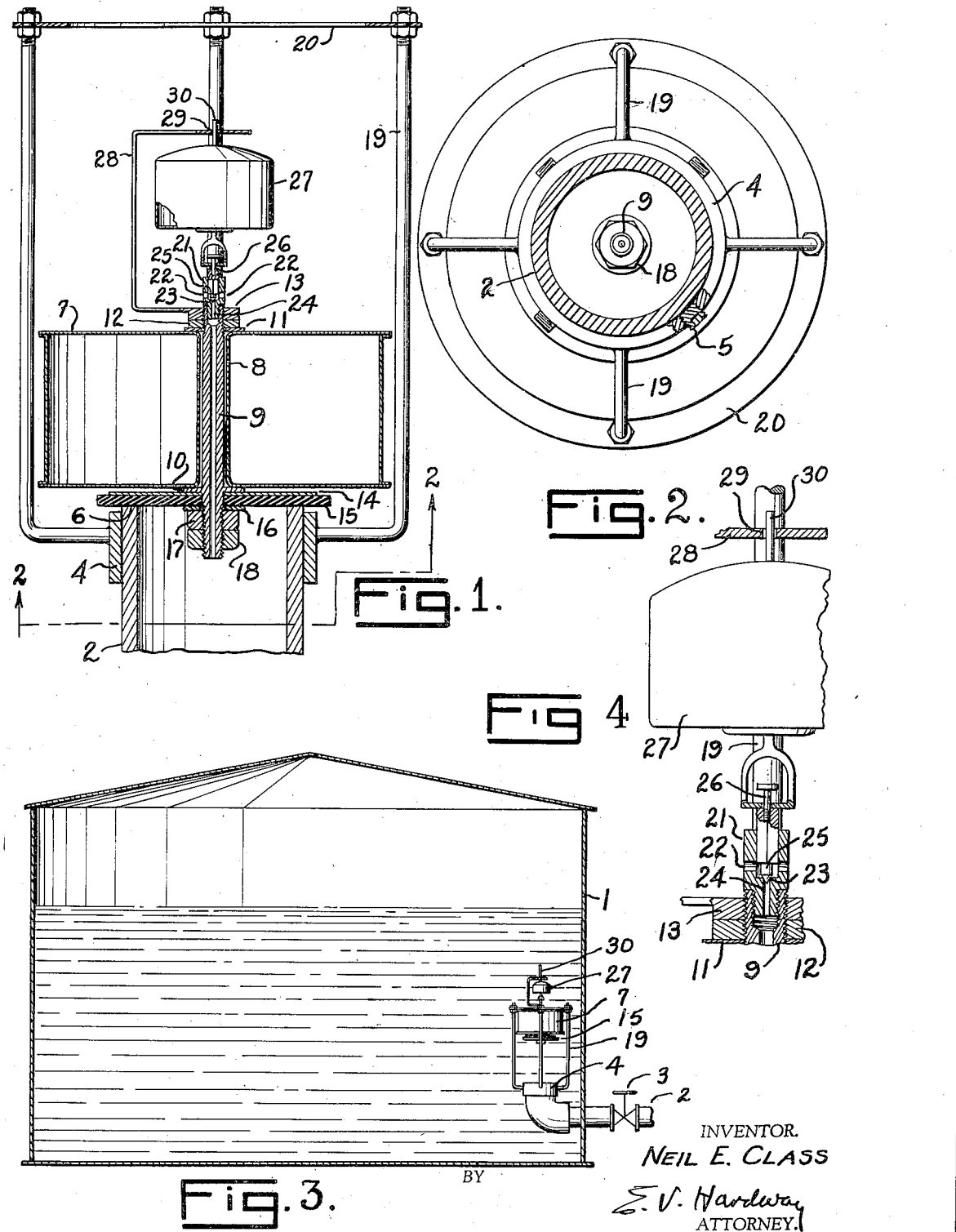

2,239,590

UNITED STATES PATENT OFFICE 2,239,590

TANK VALVE ASSEMBLY

Neil E. Class, Sealy, Tex., assignor of one-third to F. F. Thompson, Kankakee, Ill., and one-third to C. B. Franks, Midlothian, Tex.

Application September 8, 1939, Serial No. 293,901

2 Claims. (Cl. 137—68)

This invention relates to a tank valve assembly.

An object of the invention is to provide a float controlled valve which in turn is adapted to control the discharge line leading from a tank, such as an oil tank.

As is well known oil is collected and stored in large tanks. The oil so stored is periodically delivered from the tank into the pipe line through a discharge line connected into the tank. In discharging the oil from the tank it is desirable that the end of the discharge line within the tank be closed when the tank has been emptied so that air will not be permitted to enter the discharge line to interfere with the operation of the pumps or to reach the pipe line. When the tank is again filled with oil it is desirable that the end of the discharge line within the tank be opened so that the tank can again be emptied at the proper time. The present invention relates to a valve assembly for so controlling the discharge line that the tank may be readily emptied and so that air will be excluded from the discharge line when the tank is emptied.

It is a further object of the invention to provide means for preventing the valve, when closed, from being maintained in closed position by a vacuum created in the discharge line.

With the above and other objects in view the invention has particular relation to certain novel features of construction, operation and arrangement of parts, an example of which is given in this specification and illustrated in the accompanying drawing, wherein:

Figure 1 shows a side elevation of the assembly, partly in section.

Figure 2 shows a sectional view taken on the line 2—2 of Figure 1.

Figure 3 shows a sectional view of a tank equipped with the valve assembly, and

Figure 4 shows an enlarged fragmentary sectional view of the pilot valve assembly.

Referring now more particularly to the drawing wherein like numerals of reference designate the same parts in each of the figures, the numeral 1 designates a tank having a discharge line 2 leading from the bottom thereof and controlled by a valve 3 which is accessible from without the tank. The inner end of the discharge pipe 2 is upturned and surrounding the free end of the upturned portion there is a clamp ring 4 which is releasably secured in place by means of set screws at 5. The upper end of the upturned portion 2 extends above the ring 4 and forms an annular valve seat 6. The numeral 7 designates a float having a central, vertical bearing 8 through which a tubular stem 9 extends. The float is seated on the annular flange 10 carried by the stem and fitted over the upper end of the stem there is a washer 11 which is clamped against the upper end of the float by the clamp nut 12 and the lock nut 13.

A reinforcing plate 14 is fitted over the lower end of the stem against the flange 10 and a valve 15, formed of resilient material such as leather is fitted over the lower end of the stem against the plate 14 and is secured in position by the washer 16, the clamp nut 17 and the lock nut 18, said nuts being threaded onto the lower end of the stem as shown in Figure 1. The valve 15 is thus secured in relation to the float to move with it.

In emptying the tank it is thus obvious that the valve 15 will land on the seat 6 before the inner end of the discharge pipe 2 is uncovered so that no air will be permitted to enter the discharge pipe.

The float is confined to approximately vertical movements by means of a cage which includes the upstanding side rods 19 whose lower ends are inwardly turned and secured to the clamp ring and whose upper ends are secured to the ring 20 as shown in Figures 1 and 2.

When it is desired to empty the tank the valve 3 may be opened and the oil is usually pumped out of the tank and into the pipe line. Accordingly, when the valve 15 is closed there will be at least a partial vacuum created in the discharge line 2 before the valve 3 has been closed and this will tend to maintain the valve 15 on its seat. As hereinbefore stated the stem 9 is tubular. A valve cage 21 is screwed into the upper end of the stem 9. This cage has the side inlets 22, the inside valve seat 23 and the inlet duct 24 leading from said seat. A needle valve 25 normally closes the seat 23 and has a stem 26 upstanding therefrom which is loosely connected to a small float 27, and is detachable from the valve 25.

A bracket 28 is attached to the lock nut 13 and its upper end is overturned and provided with a bearing 29 through which the stem 30, upstanding from the valve 27, works. When the tank is emptied the float 27 will be in its lower position and the needle valve 25 will be closed. When oil is delivered to the tank to again fill it the valve 3 should, of course, be closed and as the tank is filled should there be sufficient vacuum created in the discharge line between the valve 3 and the seat 6 to hold the valve 15 closed when the level of the oil is sufficiently high to elevate the float 27 the needle valve 25 will be thereby opened and oil will flow through the openings 22, the seat 23 and the duct 24 and on down into the upturned end of the discharge pipe 2 so as to break said vacuum whereupon the float 7 will immediately rise to the position shown in Figure 3 thus opening the inner end of the discharge pipe 2 so that when the valve 3 is again opened to drain the tank the valve 15 will be, and remain, open until the tank has again emptied.

The drawing and description are illustrative merely, while the broad principle of the invention will be defined by the appended claims.

What I claim is:

1. The combination with a tank discharge line of a valve controlling the flow of fluid from the tank through the line, a float connected to the valve, said float being arranged to control the valve so that only liquid is allowed to be discharged through said line, a by-pass through the valve adapted to equalize the pressure in the tank and in the discharge line, and a float valve adapted to control said by-pass.

2. The combination with a tank discharge line having an upwardly facing valve seat within the tank, of a discharge valve, a float connected to said valve, means for confining the movement of the float and valve to an approximately vertical direction to open and close the valve, said float and valve having a by-pass therethrough, a float valve assembly mounted on said float comprising a by-pass valve arranged to control the flow of fluid through said by-pass and a float actuating the by-pass valve, whereby both valves will be closed when the liquid level in the tank falls, and the by-pass valve will open to allow pressure in the line to be equalized with pressure in the tank when the liquid in the tank rises.

NEIL E. CLASS.